US009992810B2

(12) United States Patent
Ramasamy et al.

(10) Patent No.: US 9,992,810 B2
(45) Date of Patent: Jun. 5, 2018

(54) METHOD FOR PROVIDING INTEGRITY PROTECTION IN A DUAL SIM DUAL STANDBY DEVICE (71) Applicant: Samsung Electronics Co., Ltd., Gyeonggi-do (KR)

(72) Inventors: Ananth Kumar Ramasamy, Bangalore (IN); Bharat Vinayak Bhat, Bangalore (IN); Nitin Jain, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/221,181

(22) Filed: Jul. 27, 2016

(65) Prior Publication Data
US 2017/0064762 A1 Mar. 2, 2017

Related U.S. Application Data (60) Provisional application No. 62/210,124, filed on Aug. 26, 2015.

(30) Foreign Application Priority Data

Oct. 16, 2015 (IN) .................................... 1269/2015

(51) Int. Cl.
*H04W 76/02* (2009.01)
*H04W 76/04* (2009.01)
(Continued)

(52) U.S. Cl.
CPC .......... *H04W 76/026* (2013.01); *H04W 4/16* (2013.01); *H04W 8/183* (2013.01); *H04W 68/02* (2013.01); *H04W 76/046* (2013.01); *H04W 88/06* (2013.01)

(58) Field of Classification Search
CPC ..... H04W 76/026; H04W 4/16; H04W 68/02; H04W 76/046; H04W 88/04
(Continued)

(56) References Cited

U.S. PATENT DOCUMENTS 7,748,034 B2    6/2010   Fluhrer et al.
8,995,664 B2 *  3/2015   Baglin .................. H04W 12/04
                                                         380/270
(Continued)

FOREIGN PATENT DOCUMENTS

EP        2 785 091       10/2014
WO    WO 2015/067823      5/2015

OTHER PUBLICATIONS

3rd Generation Partnership Project; Technical Specification Group Radio Access Network; Evolved Universal Terrestrial Radio Access (E-UTRA); Packet Data Convergence Protocol (PDCP) Specification (Release 12), 3GPP TS 36.323 V12.4.0, Jun. 1, 2015, 34 pages.

(Continued)

*Primary Examiner* — Edward Urban
*Assistant Examiner* — Ralph H Justus
(74) *Attorney, Agent, or Firm* — The Farrell Law Firm, P.C.

(57) ABSTRACT

Methods and apparatuses are provided for providing integrity protection in a dual subscriber identity module (SIM) dual standby (DSDS) device. A first message is received on a first SIM of the DSDS device before a radio resource of the DSDS device is tuned away from the first SIM to a second SIM by performing a tune-away procedure. A second message is received after completion of the tune-away procedure. The second message is validated. It is determined whether a first payload of the first message matches a second payload of the second message, when the first message and the second message have a same message sequence number. It is determined that the second message is a duplicate message, when the first payload matches the second payload.

10 Claims, 7 Drawing Sheets (51) Int. Cl.
*H04W 68/02* (2009.01)
*H04W 4/16* (2009.01)
*H04W 8/18* (2009.01)
*H04W 88/06* (2009.01)

(58) Field of Classification Search
USPC .......................................................... 455/558
See application file for complete search history.

(56) References Cited

U.S. PATENT DOCUMENTS

| | | | | |
|---|---|---|---|---|
| 2009/0025060 A1* | 1/2009 | Mukherjee | ............ | H04W 12/02 726/3 |
| 2010/0113024 A1* | 5/2010 | Wu | ........................ | H04W 36/14 455/436 |
| 2012/0134354 A1 | 5/2012 | Lucky et al. | | |
| 2012/0190362 A1* | 7/2012 | Subbarayudu | ...... | H04W 76/048 455/435.1 |
| 2012/0230186 A1* | 9/2012 | Lee | ........................ | H04L 43/028 370/230 |
| 2013/0150096 A1* | 6/2013 | Hanchate | ................ | H04W 4/06 455/466 |
| 2014/0098657 A1 | 4/2014 | Kubota et al. | | |
| 2014/0248922 A1* | 9/2014 | Josso | .................. | H04W 60/005 455/552.1 |
| 2015/0372788 A1* | 12/2015 | Xiao | ........................ | H04L 1/08 714/748 |
| 2016/0205536 A1* | 7/2016 | Batchu | .................. | H04W 48/12 455/558 |
| 2017/0006604 A1* | 1/2017 | Challa | ..................... | H04W 4/06 |

OTHER PUBLICATIONS

German Search Report dated Jul. 10, 2017 issued in counterpart application No. 102016216055.9, 15 pages.

\* cited by examiner

METHOD FOR PROVIDING INTEGRITY PROTECTION IN A DUAL SIM DUAL STANDBY DEVICE

PRIORITY

This application claims priority under 35 U.S.C. § 119(e) to U.S. Provisional Application No. 62/210,124, filed in the U.S. Patent and Trademark Office on Aug. 26, 2015, and under 35 U.S.C. § 119(a) to Indian Complete Patent Application Serial No. 1269/CHE/2015 (CS), filed in the Indian Intellectual Property Office on Oct. 16, 2015 in the Indian Intellectual Property Office, the contents of which are incorporated herein by reference.

BACKGROUND

1. Field of the Disclosure

The present disclosure relates to methods and apparatuses for providing integrity protection in a dual subscriber identity module (SIM) dual standby (DSDS) device.

2. Description of the Related Art

Integrity protection is present in a universal mobile telecommunications system (UMTS) or a long term evolution (LTE) system in order to confirm whether a message transmitted by a transmitter is the supposed entity, and to confirm that there is no other entity in between attempting to assume the role of the transmitter. The transmitter of the message protects the message to be transmitted by adding a message authentication code (MAC-I). The MAC-I is calculated using a Kasumi or Snow third generation (3G) scheme. An integrity key (IK), a COUNT-I, a fresh value, an encoded message, and a length of the encoded message are provided as inputs to the scheme, which assist in calculating the MAC-I. The transmitter sends the message along with the calculated MAC-I to a receiver.

The receiver of the message validates the integrity of the message by calculating the xMAC-I with the same inputs that are used by the transmitter. If the received MAC-I matches the calculated xMAC-I, the message is validated and processed further. If the received MAC-I does not match the calculated xMAC-I, the message fails for integrity and the message is discarded by the receiver.

Generally, in a DSDS device, there is a single radio frequency (RF) antenna multiplexed between two SIM stacks (i.e., SIM-1 stack and SIM-2 stack). There is always the possibility that the RF antenna is tuned away to SIM-2 stack for long durations, while the SIM-1 stack is in a connected mode with a network. For example, the SIM-2 stack may be performing an area update procedure for "n" number of seconds.

During this time, there is a black out period for the SIM-1 stack, which means the RF transceiver is not available to the SIM-1 stack. Thus, the DSDS device is more prone to miss radio resource control (RRC) signals due to frequent radio link control (RLC) re-establishment and the discarding of RLC protocol data units (PDUs) results in the discarding of RRC PDUs. There will be re-transmissions in a transmitting RRC layer for discarded RRC PDUs, however, the RRC message sequence numbers (SNs) for the retransmitted messages would have incremented. This causes a gap in the RRC message sequence number (MSN) at the receiver resulting in an RRC SN wrap around and at the transmitter, which results in a hyper frame number (HFN) increment, but the receiver still uses the previous HFN. This results in an integrity failure at the receiver leading to the discard of the message, and hence, degrading quality of service.

In conventional systems and methods, the receiver detects whether the message is the retransmission of the previous message by checking the message sequence number. This leads to wrong duplicate detection when certain signal messages are missed in between by exactly one cycle of RRC SN. In such cases, the newly received signal message will be the same message sequence number as the previously received messages RRC SN. This type of signaling miss is more prone to occur in DSDS devices, where there can be frequent RRC SN misses since the RF antenna is shared between two SIM stacks for reception.

Wrap around cases are typically only addressed when the RRC SN of a newly received message is less than the RRC SN of the last received message. Thus, the wrap around case is handled only when the signalling miss is less than one complete cycle of the RRC SN, i.e., 15 messages. For example, an RRC Rx entity the last received message may be SN 9, SN 10 to SN 1 may be missed, and then the newly received message may be SN 2. Due to the signal miss, the RRC Rx entity increments HFN by 1 in COUNT-I. This tolerance of missing 15 messages works well for a single SIM device, but for a DSDS device, it is possible to miss more than 15 RRC messages. Existing wrap around detection will not work, if the signaling miss is more than one cycle of the RRC SN, i.e., 15 messages. In this case, there will be a mismatch scenario in which the transmitting RRC entity sends the messages with HFN x+1, but RRC Rx still receives the messages with HFN x, thereby leading to an integrity failure at the RRC receiving entity. Thus, increased signaling miss is more prone to happen in DSDS devices.

SUMMARY

An aspect of the present disclosure provides a mechanism for providing integrity protection in a DSDS device. According to an aspect of the present disclosure, a method is provided for providing integrity protection in a DSDS device. A first message is received on a first SIM of the DSDS device before a radio resource of the DSDS device is tuned away from the first SIM to a second SIM by performing a tune-away procedure. A second message is received after completion of the tune-away procedure. The second message is validated. It is determined whether a first payload of the first message matches a second payload of the second message, when the first message and the second message have a same message sequence number. It is determined that the second message is a duplicate message, when the first payload matches the second payload.

According to another aspect of the present disclosure, a method is provided for providing integrity protection in a DSDS device. A new message is received after a tune-away procedure from a first SIM to a second SIM. The new message is validated. It is determined whether a first payload of a previous message matches a second payload of the new message. The new message and the previous message have a same message sequence number. It is determined that the new message is a duplicate message when the first payload matches the second payload.

According to another aspect of the present disclosure, a method is provided for providing integrity protection in a DSDS device. A new message is received from a network entity after a tune-away procedure from a first SIM to a second SIM. It is determined whether a first message sequence number of the new message is greater than a second message sequence number of a previous message.

The new message is validated by performing a first level of integrity validation without incrementing a hyper frame number of the new message.

According to another aspect of the present disclosure, a DSDS device is provided that includes a first SIM card, a second SIM card, a memory, and a processor coupled to the memory, the first SIM card, and the second SIM card. The processor is configured with processor executable instructions to receive a first message on the first SIM card before a radio resource of the DSDS device is tuned away from the first SIM card to the second SIM card by performing a tune-away procedure. The processor is further configured to receive a second message after completion of the tune-away procedure, and validate the second message. The processor is further configured to determining whether a first payload of the first message matches a second payload of the second message, when the first message and the second message have a same message sequence number. The processor is further configured to determine that the second message is a duplicate message, when the first payload matches the second payload.

According to another aspect of the present disclosure, a DSDS device is provided that includes a first SIM card, a second SIM card, a memory, and a processor coupled to the memory, the first SIM card, and the second SIM card. The processor is configured with processor executable instructions to receive a new message after a tune-away procedure from a first SIM to a second SIM, validate the new message, and determine whether a first payload of a previous message matches a second payload of the new message. The new message and the previous message have a same message sequence number. The processor is further configured to determine that the new message is a duplicate message when the first payload matches the second payload.

According to another aspect of the present disclosure, a DSDS device is provided that includes a first SIM card, a second SIM card, a memory, and a processor coupled to the memory, the first SIM card, and the second SIM card. The processor is configured with processor executable instructions to receive a new message from a network entity after a tune-away procedure from a first SIM to a second SIM, determine whether a first message sequence number of the new message is greater than a second message sequence number of a previous message, and validate the new message by performing a first level of integrity validation without incrementing a hyper frame number of the new message.

According to another aspect of the present disclosure, a computer program product is provided having computer executable program code recorded on a computer readable non-transitory storage medium. The computer executable program code when executed causes the actions including: receiving a first message on a first SIM of the DSDS device, before a radio resource of the DSDS device is tuned away from the first SIM to a second SIM by performing a tune-away procedure; receiving a second message after completion of the tune-away procedure; validating the second message; determining whether a first payload of the first message matches a second payload of the second message, when the first message and the second message have a same message sequence number; and determining that the second message is a duplicate message, when the first payload matches the second payload.

According to another aspect of the present disclosure, a computer program product is provided that includes computer executable program code recorded on a computer readable non-transitory storage medium. The computer executable program code when executed causes the actions including: receiving a new message after a tune-away procedure from a first SIM to a second SIM; validating the new message; determining whether a first payload of a previous message matches a second payload of the new message, wherein the new message and the previous message have a same message sequence number; and determining that the new message is a duplicate message when the first payload matches the second payload.

According to another aspect of the present disclosure, a computer program product is provided that includes computer executable program code recorded on a computer readable non-transitory storage medium. The computer executable program code when executed causes the actions including: receiving a new message from a network entity after a tune-away procedure from a first SIM to a second SIM; determining whether a first message sequence number of the new message is greater than a second message sequence number of a previous message; and validating the new message by performing a first level of integrity validation without incrementing a hyper frame number of the new message.

According to another aspect of the present disclosure, a method is provided for providing integrity protection in a DSDS device. A new message is received after a tune-away procedure from a first SIM to a second SIM. It is determined that the new message is a duplicate message and the new message is discarded, when a first payload of the new message matches a second payload of the previous message, and when a first message sequence number of the new message matches a second message sequence number of the pervious message. A first level of integrity validation is performed based on a MAC and a non-incremented hyper frame number of the new message, when the first message sequence number is greater than the second message sequence number. A second level of integrity validation is performed based on the MAC and an incremented hyper frame number, when the first level of integrity validation is unsuccessful. The new message is processed, when the first or second level of integrity validation is successful.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Embodiments described herein are not necessarily mutually exclusive, as some embodiments can be combined with one or more other embodiments to form new embodiments. The term "or", as used herein, refers to a non-exclusive or, unless otherwise indicated. The examples used herein are intended merely to facilitate an understanding of ways in which the embodiments can be practiced and to further enable those skilled in the art to practice the embodiments. Accordingly, the examples should not be construed as limiting the scope of the embodiments described herein.

Prior to describing the embodiments in detail, definitions for key terms used herein are provided below. Unless defined otherwise, all technical terms used herein have the same meanings as those commonly understood by a person having ordinary skill in the art to which this invention belongs.

An integrity key (IK) is generated in a device and in a network during an authentication procedure. Further, the generated IK is stored in a universal subscriber identity module (USIM) in the device until it is updated in a next authentication procedure cycle.

A FRESH value parameter is generated by a universal terrestrial radio access network (UTRAN) and shall be transmitted to the device in a security mode control procedure. The FRESH value has a length of 32 bits.

A COUNT-I parameter is a 32 bit number that is divided into two parts, such as, for example, a message SN and an HFN.

A least significant bit (LSB) (4 bits) of COUNT-I corresponds to RRC SN. During the start of integrity protection, the LSB is loaded with the RRC SN of a first transmitted message, and next, for each message, the RRC SN is incremented by "1". When it reaches "15", the next increment wraps it around to value "0".

A most significant bit (MSB) (28 bits) of COUNT-I corresponds to the HFN. During the start of integrity protection, the HFN part is either loaded with "0" (if a new key negotiation happened) or loaded with the latest exchanged start value (if the new key negotiation has not happened). Further, the HFN value will be incremented by "1", when the RRC SN wraps around.

An encoded message refers to a message buffer received from a lower layer in case of a downlink or an abstract syntax notation (ASN) encoded message in case of uplink. Before the encoded message is inputted to an integrity scheme, the MAC-I part of the message is set with the associated identifier and the SN part of the message is set to "0".

In conventional systems and methods, message packets with some message sequence numbers (i.e., SN4-SN2) are missed by SIM-1 in the DSDS device because the RF resource is used by SIM-2. If the SIM-1 receives a next message packet having the same message sequence number (i.e., SN3) as the previously received message packet, the newly received message packet with the message sequence number (SN3) is wrongly discarded, even though the payloads are different.

In another scenario, the message packets with the message sequence numbers (SN4-SN3) are missed by the SIM-1 in the DSDS device because the RF resources are used by the SIM-2. If a next message packet is received having a message sequence number "4" (SN4), which is greater than the message sequence number of the previously received message packet, it is wrongly checked for integrity with the old hyper frame number value.

Unlike the conventional systems and methods, embodiments of the present disclosure provide an enhanced duplicate detection mechanism where the DSDS device determines the integrity of the message by checking the message payload rather than the message sequence number alone. The proposed method also provides an enhanced wrap around detection mechanism, where the DSDS device checks the integrity of the message in two levels, i.e., performing a first level of integrity validation without incrementing the hyper frame number, and performing a second level of integrity validation with the incremented hyper frame number when the first level of integrity validation is unsuccessful.

With the embodiments of the present disclosure, the robustness of the integrity protection is not compromised since the DSDS device stores the previous message only after performing integrity validation. Further, the DSDS device compares the newly received message (i.e., new message) with the previous message after performing integrity validation on the newly received message.

Figure 1A:
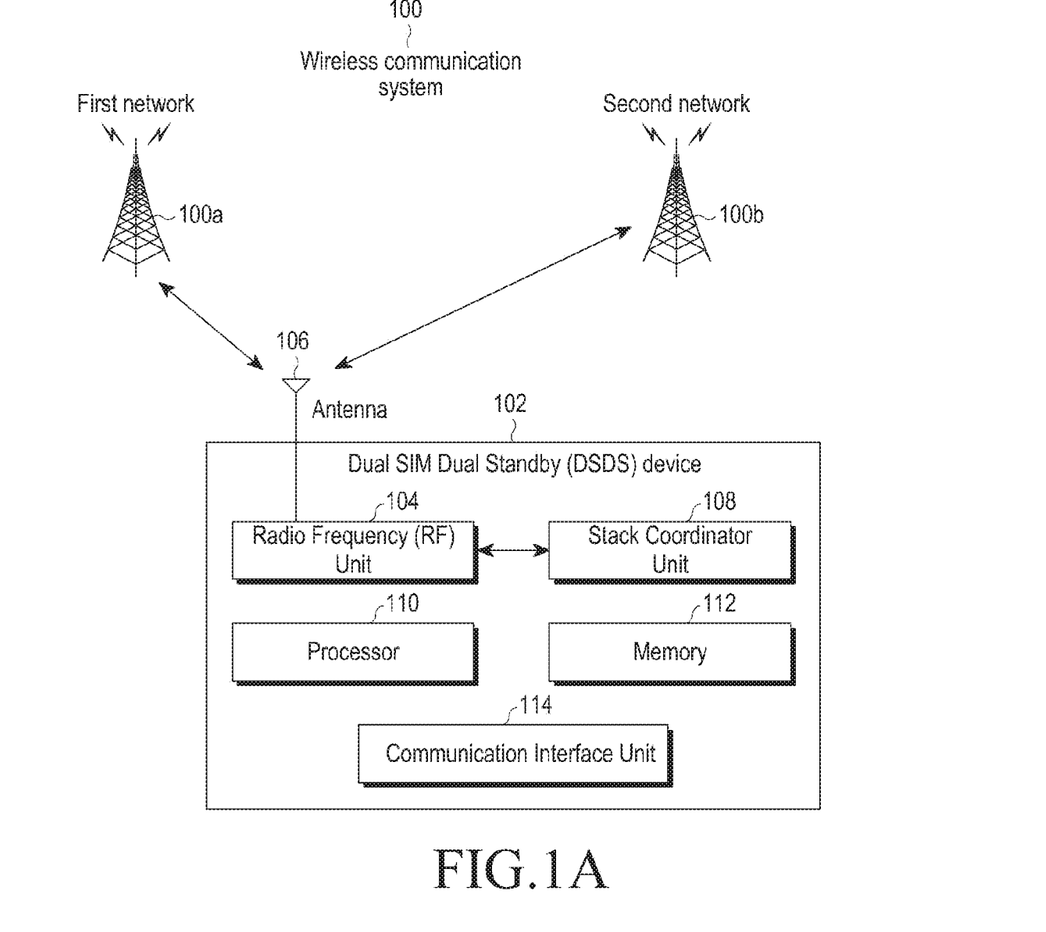
FIG. 1A is a diagram illustrating a wireless communication system for providing integrity protection in a DSDS device, according to an embodiment of the present disclosure.

FIG. 1A is a diagram illustrating a wireless communication system for providing integrity protection in a DSDS device, according to an embodiment of the present disclosure. A wireless communication system 100 includes a first network 100a, a second network 100b, and a DSDS device 102.

The DSDS device 102 can have layered architecture to communicate with the first network 100a and the second network 100b associated with SIMs. For example, a first SIM in the DSDS device 102 is in communication with the first network 100a and a second SIM in the DSDS device 102 is in communication with the second network 100b. The architecture for the DSDS device 102 can have multiple protocol stacks, each of which may be associated with the separate SIM. The two SIMS may be associated with the same or a different cellular network, and may be using the same or different radio access technologies.

The first network 100a and the second network 100b can be, for example, but are not limited to, a global system for mobile communications (GSM) enhanced data rates for GSM evolution (EDGE) radio access network (GERAN), a UMTS radio access network (UTRAN), an evolved UTRAN (EUTRAN), or any other network. In an embodiment of the present disclosure, the first network 100a and the second network 100b can belong to the same network operator or a different network operator.

The DSDS device 102 includes an RF unit 104 coupled with an antenna 106, a stack coordinator unit 108, a processor 110, a memory 112, and a communication interface unit 114. The RF unit 104 receives RF signals from the antenna 106. The RF unit 104 converts the received RF signals to baseband signals. The RF unit 104 also converts received baseband signals to RF signals that are sent out to the antenna 106. The stack coordinator unit 108 includes two stacks associated with two SIMs, namely a first SIM (i.e., first SIM card) and a second SIM (i.e., second SIM card). The first SIM and the second SIM share a single RF transceiver from the RF unit 104. The two stacks share the RF transceiver from the first network 100a and the second network 100b.

Figure 1B:
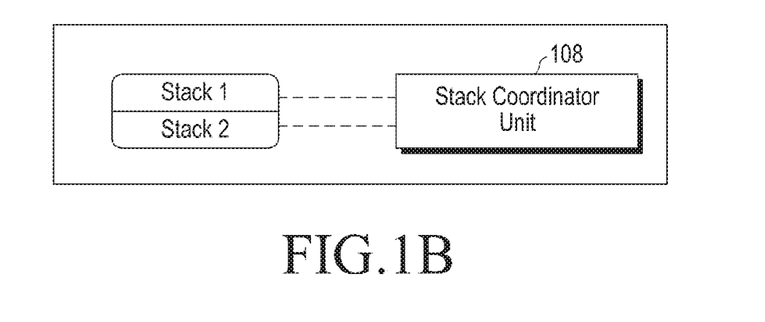
FIG. 1B is a diagram illustrating multiple stacks present in the DSDS device, according to an embodiment of the present disclosure.

FIG. 1B is a diagram illustrating multiple stacks present in the DSDS device, according to an embodiment of the present disclosure. As depicted in the FIG. 1B, the stack coordinator unit 108 communicates with the two stacks (stack 1 and stack 2) in the DSDS device 102.

The DSDS device 102 is in a connected mode on the first stack, when there is an ongoing packet switched (PS) data session between the DSDS device 102 and the first network 100a on the first stack by utilizing the RF transceiver. During the ongoing PS data session, the DSDS device 102 receives a plurality of signaling messages in a sequential manner. In an embodiment of the present disclosure, the processor 110 receives a new message from the first network 100a (i.e., network entity). The new message includes a MAC computed based on at least one integrity parameter at the first network 100a. The integrity parameter is an IK, a COUNT-I, a Fresh value, an encoded message, a length of the encoded message, or combination of the same.

The processor 110 generates a candidate MAC based on the integrity parameter and determines whether the MAC of the new message matches with the candidate MAC. Further, the processor 110 validates the new message after determining that the MAC of the new message matches with the candidate MAC. After validating the new message, the processor 110 can be configured to determine whether a payload of the new message matches a payload of a previous message, where the new message and the previous message include same message sequence number. The previous message is integrity validated. Further, the processor 110 can be configured to detect the new message is a duplicate message after determining that the payload of the new message matches the payload of the previous message.

For example, the DSDS device 102 received the previous message with the message sequence number "3" (i.e., SN3) as the first SIM utilizes the RF transceiver during an ongoing data session with the first network 100a. The messages with message sequence numbers SN4-SN2 are missed by the DSDS device 102 because the RF transceiver is used by the second SIM for performing the area update procedure.

Once the area update procedure is completed, the first SIM utilizes the RF transceiver for the DSDS device 102 to receive the next message (i.e., new message) with the same message sequence number "3" (i.e., SN3) from the first network 100a. The new message includes the MAC computed based on the integrity parameter at the first network 100a. After receiving the new message including the MAC, the DSDS device 102 generates the candidate MAC based on the integrity parameter. The DSDS device 102 determines whether the MAC of the new message matches with the candidate MAC. The new message is validated after determining that the MAC of the new message matches the candidate MAC.

After validating the new message, the DSDS device 102 determines whether the payload (i.e., size and content of the message) of the new message matches the payload of the previous message. Though the message sequence number was same as the previous message, the payload was different, and hence the message is not detected as a duplicate message and the message is processed further.

In another embodiment of the present disclosure, after receiving the new message from the first network 100a, the processor 110 can be configured to determine whether the message sequence number of the new message is greater than the message sequence number of the previous message. Further, the processor 110 can be configured to validate the new message by performing a first level of integrity validation on the new message based on a hyper frame number. The hyper frame number is incremented by the processor 110 when the first level of integrity validation is unsuccessful. Further, the processor 110 can be configured to validate the new message by performing a second level of integrity validation on the new message with the incremented hyper frame number. The new message is processed by the processor 110 when the second level of integrity validation is successful. Performance of the first level of integrity validation is described in greater detail below with respect to FIG. 5. Further, performance of the second level of integrity validation is described in greater detail below with respect to FIG. 6.

The memory 112 may include one or more computer-readable storage media. The memory 112 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 112 may, in some examples, be considered a non-transitory storage medium. The term "non-transitory" may indicate that the storage medium is not embodied in a carrier wave or a propagated signal. However, the term "non-transitory" should not be interpreted to mean that the memory 112 is non-movable. In some examples, the memory 112 is configured to store larger amounts of information. In certain examples, a non-transitory storage medium may store data that can, over time, change (e.g., in random access memory (RAM) or cache).

In an embodiment of the present disclosure, the communication interface unit 114 receives the messages from the first network 100a or the second network 100b during an ongoing PS connected data session. In another embodiment, the communication interface unit 114 can invoke an area update procedure with the first network 100a or the second network 100b by sending one or more signaling messages associated with the area update procedure.

Unlike conventional systems and methods, embodiments of the present disclosure provides an enhanced solution for duplication detection of the message and message sequence number wrap around detection at an RRC protocol layer in the DSDS device for improved quality of service (QoS).

Figure 2:
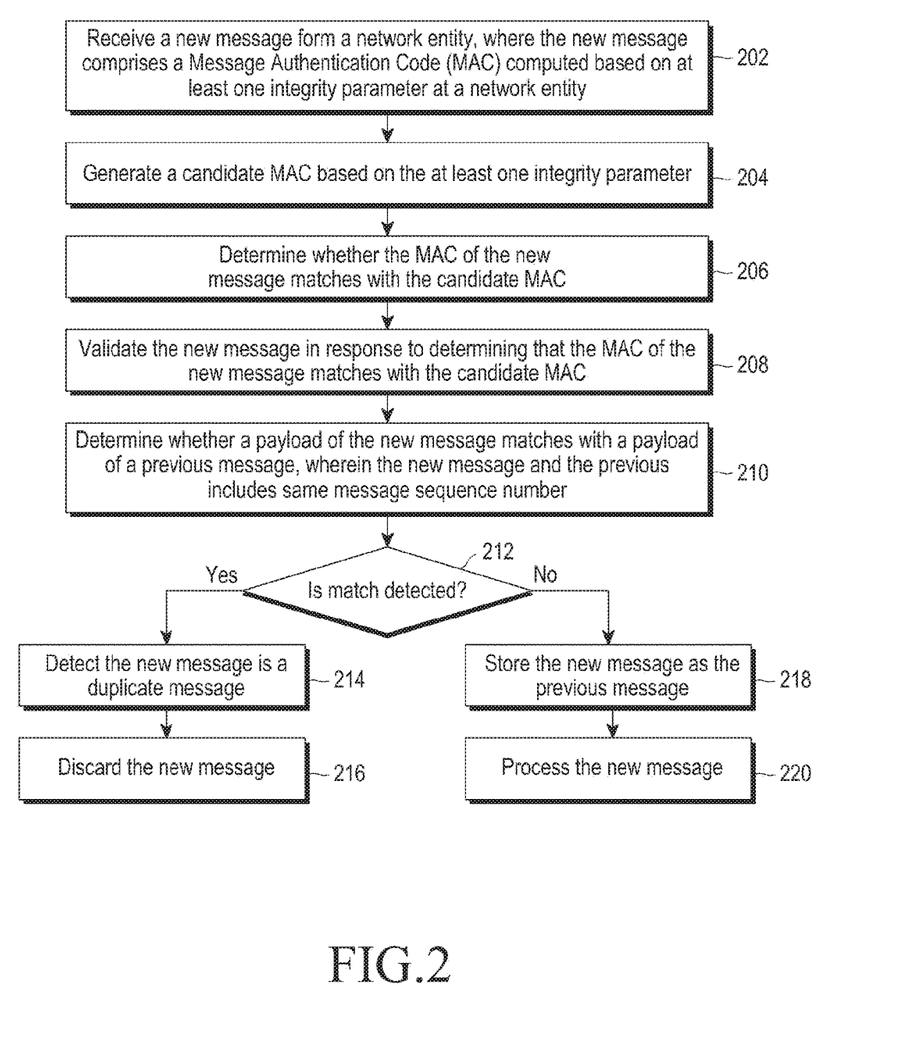
FIG. 2 is a flowchart illustrating a method for detecting a duplicate message in the DSDS device, according to an embodiment of the present disclosure.

FIG. 2 is a flowchart illustrating a method for detecting a duplicate message in the DSDS device, according to an embodiment of the present disclosure. In step 202, a new message is received from the first network 100a (i.e., network entity). The processor 110 receives the new message from the first network 100a. The new message includes the MAC computed based on the integrity parameter at the first network 100a. The integrity parameter can be the IK, the COUNT-I, the Fresh value, the encoded message, the length of the encoded message, or a combination of the same.

In step 204, the processor 110 generates a candidate MAC based on the integrity parameter. In step 206, the processor 110 determines whether the MAC of the new message matches with the candidate MAC.

In step 208, the processor 110 validates the new message after determining that the MAC of the new message matches the candidate MAC. In step 210, the processor 110 determines whether the payload of the new message matches the payload of the previous message. The new message and the previous message include same message sequence number. The payload includes the content of the message and size of the message.

In an embodiment of the present disclosure, the payload of the new message is matched with the payload of the previous message after excluding the MAC part of bytes in the encoded message. Thus, the mechanism for detecting the duplicate message works even when the same message is retransmitted with a different MAC. In order to improve the efficiency of the matching, initially, the message size of the new message and the previous message are cross checked and only if both are same does the DSDS device 102 match the message payload byte-by-byte, excluding the MAC part. If both messages are the same in terms of size and payload (excluding the MAC part), the message is discarded since it is a duplicate. If both are different then, the new message is processed.

In step 212, it is determined whether a match is detected. If a match is detected, the processor detects that the new message is a duplicate message, in step 214. In step 216, the processor 110 discards the new message. If a match is not detected, the processor 110 stores the new message as the previous message in the DSDS device 102. In step 220, the processor 110 processes the new message.

The various actions, acts, blocks, steps, or the like, of FIG. 2, may be performed in the order presented, in a different order, or simultaneously. Further, in some embodiments, some of the actions, acts, blocks, steps, or the like may be omitted, added, modified, skipped, or the like, without departing from the scope of the present disclosure.

Figure 3:
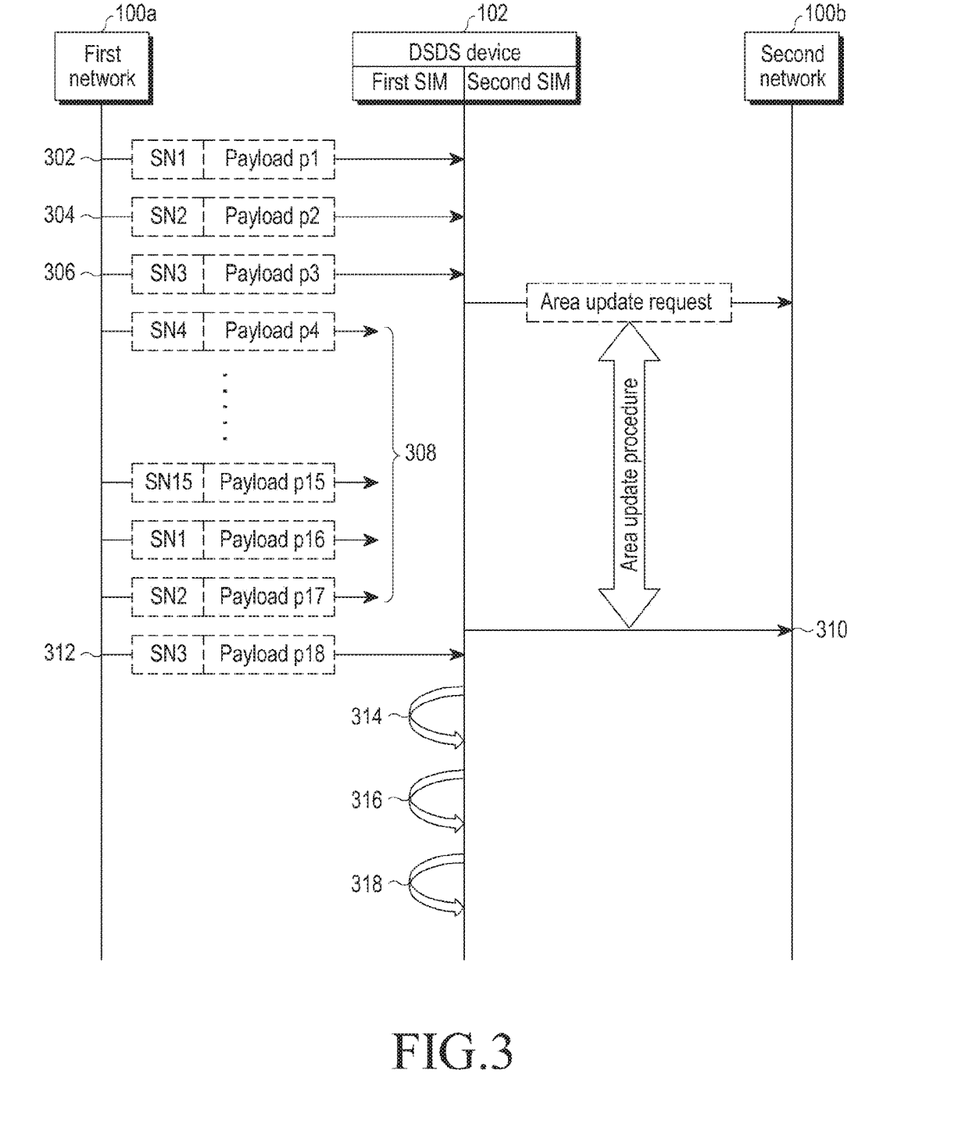
FIG. 3 is a diagram illustrating detection of a duplicate message in the DSDS device, according to an embodiment of the present disclosure.

FIG. 3 is a diagram illustrating detection of a duplicate message in the DSDS device, according to an embodiment of the present disclosure. FIG. 3 depicts communication between the first network 100a, the second network 100b, and the DSDS device 102. The DSDS device 102 is in a connected mode on the first SIM, i.e., there is an ongoing PS data session between the DSDS device 102 and the first network 100a on the first SIM by utilizing the RF transceiver. During the ongoing PS data session, the DSDS device 102 receives a plurality of signaling messages in a sequential manner, as described below. The DSDS device 102 receives a message with a message sequence number "1" and payload (p1) from the first network 100a during the ongoing PS data session, in step 302.

The DSDS device 102 receives a message with a message sequence number "2" and payload (p2) from the first network 100a during the ongoing PS data session, in step 304.

The DSDS device 102 receives a message with a message sequence number "3" and payload (p3) from the first network 100a during the ongoing PS data session, in step 306.

The RF transceiver is used by the second SIM to establish a connection between the DSDS device 102 and the second network 100b, in step 308. In an embodiment of the present disclosure, the connection is established to perform an area update procedure. In another embodiment, in case of low signal strength, a radio resource of the first SIM tunes away to the second SIM by performing the tune-away procedure. During this time, messages with message sequence numbers SN4-SN2 and payloads p14-p17 are missed by the DSDS device 102 because the RF transceiver is used by the second SIM.

After completing the area update procedure, the RF transceiver is used by the first SIM to re-establish the connection between the first network 100a and the DSDS device 102, in step 310.

After re-establishing the connection between the DSDS device 102 and the first network 100a, the DSDS device 102 receives a new message with a message sequence number "3" and a payload "p18" from the first network 100a, in step 312. The message sequence number "3" of the new message is same as the message sequence number "3" of the last received message (i.e., previous message) in step 306.

After receiving the new message, the DSDS device 102 validates the new message, in step 314. The detailed procedure of performing the validation of the new message is described in greater detail with respect to FIG. 1A above.

The DSDS device 102 determines whether the payload of the new message matches the payload of the last received message (i.e., previous message), in step 316.

The DSDS device 102 detects that the new message is not the duplicate message since the payload of the new message does not match the payload of the last received message, in step 318, though the message sequence number of the new message was same as the message sequence number of the previous message.

In an example, when the DSDS device 102 misses one complete cycle of messages and obtains a new message with a message sequence number that is the same as that of the previous message, the actual payload is different. Thus, comparing the payload of the message is more appropriate rather than comparing the message sequence number alone for duplicate detection to enhance the QoS.

The various actions, acts, blocks, steps, or the like, in FIG. 3, may be performed in the order presented, in a different order, or simultaneously. Further, in some embodiments of the present disclosure, some of the actions, acts, blocks, steps, or the like may be omitted, added, modified, skipped, or the like, without departing from the scope of the present disclosure.

Figure 4:
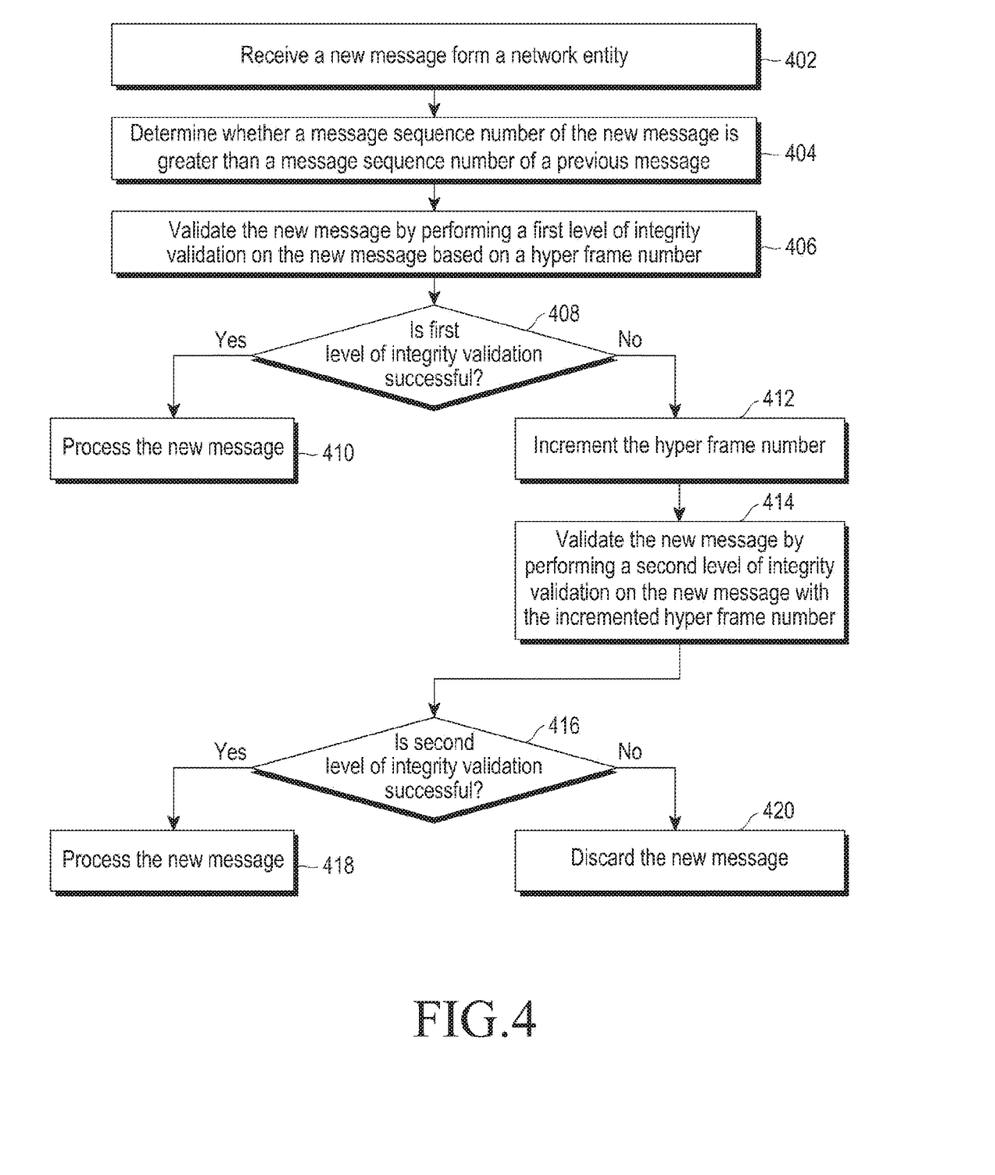
FIG. 4 is a flowchart illustrating a method for providing integrity protection in the DSDS device, according to an embodiment of the present disclosure.

FIG. 4 is a flowchart illustrating a method for providing integrity protection in the DSDS device, according to an embodiment of the present disclosure.

In step 402, the processor 110 receives a new message from the first network 100a. In step 404, the processor 110 determines whether a message sequence number of the new message is greater than a message sequence number of a previous message.

In step 406, the processor 110 validates the new message by performing a first level of integrity validation on the new message based on the hyper frame number. In step 408, it is determined whether the first level of integrity validation is successful. If the first level of integrity validation is successful, the processor 110 processes the new message, in step 410.

If it is determined that the first level of integrity protection is unsuccessful, the processor increments the hyper frame number, in step 412. In step 414, the processor validates the new message by performing a second level of integrity validation on the new message with the incremented hyper frame number.

In step 416, it is determined whether the second level of integrity validation is successful. If the second level of integrity validation is successful, the processor 110 processes the new message, in step 418. If it is determined that the second level of integrity protection is unsuccessful, the processor 110 discards the new message.

The various actions, acts, blocks, steps, or the like, in FIG. 4, may be performed in the order presented, in a different order, or simultaneously. Further, in some embodiments, some of the actions, acts, blocks, steps, or the like may be omitted, added, modified, skipped, or the like, without departing from the scope of the present disclosure.

Figure 5:
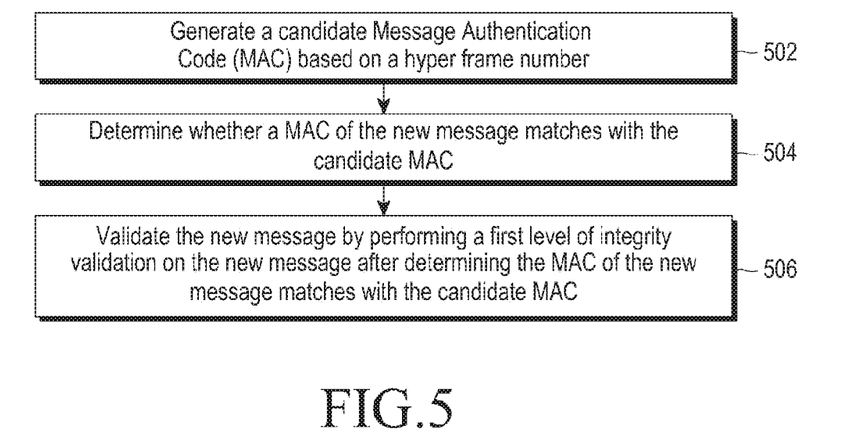
FIG. 5 is a flowchart illustrating a method for performing a first level of integrity validation, according to an embodiment of the present disclosure.

FIG. 5 is a flowchart illustrating a method for performing the first level of integrity validation, according to an embodiment of the present disclosure.

In step 502, the processor 110 generates the candidate MAC based on the hyper frame number. The candidate MAC is generated after receiving the new message from the first network 100a, and the new message includes the MAC generated at the first network 100a.

In step 504, the processor determines whether the MAC of the new message matches the candidate MAC. In step 506, the processor 110 validates the new message by performing the first level of integrity validation on the new message after determining that the MAC of the new message matches the candidate MAC.

The various actions, acts, blocks, steps, or the like, in FIG. 5, may be performed in the order presented, in a different order, or simultaneously. Further, in some embodiments, some of the actions, acts, blocks, steps, or the like may be omitted, added, modified, skipped, or the like, without departing from the scope of the present disclosure.

Figure 6:
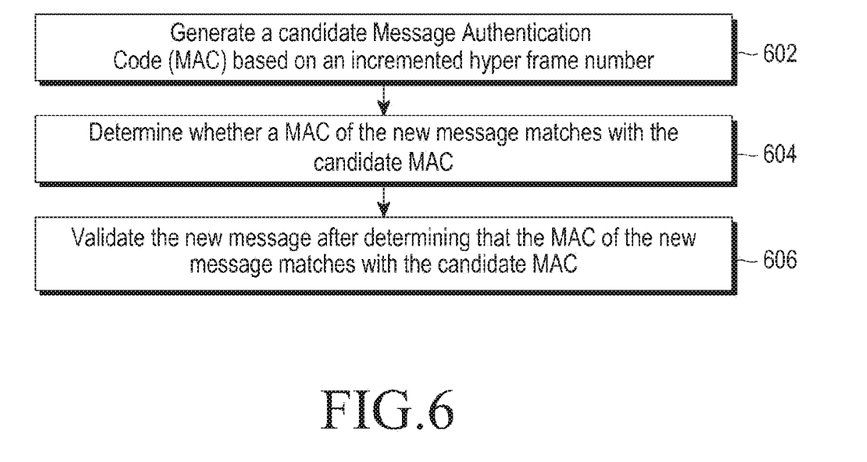
FIG. 6 is a flowchart illustrating a method for performing a second level of integrity validation, according to an embodiment of the present disclosure.

FIG. 6 is a flowchart illustrating a method for performing a second level of integrity protection, according to an embodiment of the present disclosure.

In step 602, the processor 110 generates the candidate MAC based on the incremented hyper frame number.

In step 604, the processor 110 determines whether the MAC of the new message matches the candidate MAC. In step 606, the processor 110 validates the new message by performing the second level of integrity validation with the incremented hyper frame number, after determining that the MAC of the new message matches the candidate MAC.

The various actions, acts, blocks, steps, or the like, in FIG. 6, may be performed in the order presented, in a different order, or simultaneously. Further, in some embodiments, some of the actions, acts, blocks, steps, or the like may be omitted, added, modified, skipped, or the like, without departing from the scope of the present disclosure.

Figure 7:
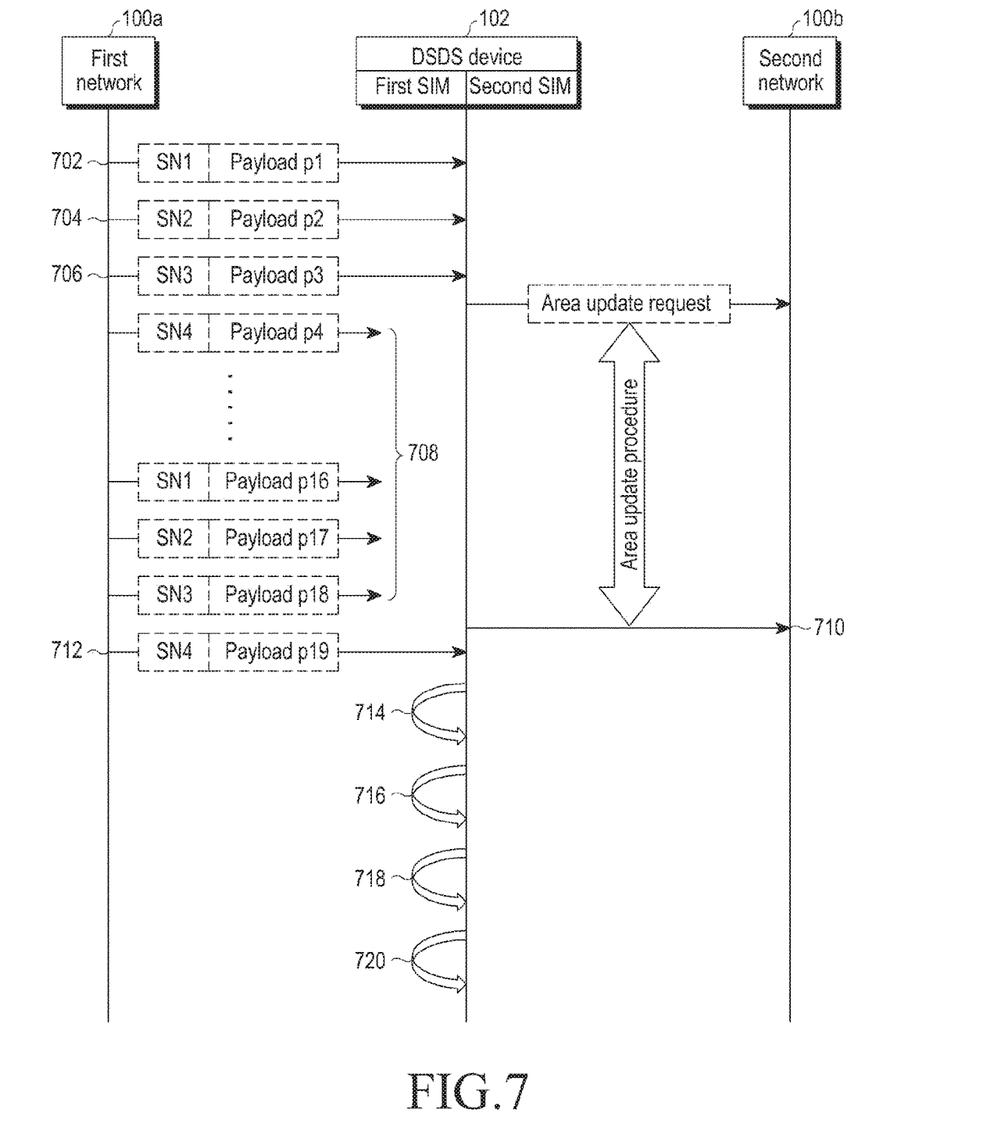
FIG. 7 is a diagram illustrating the providing of integrity protection in the DSDS device, according to an embodiment of the present disclosure.

FIG. 7 is a diagram illustrating integrity protection in the DSDS device, according to an embodiment of the present disclosure. The signaling sequence depicts communication between the first network 100a, the second network 100b, and the DSDS device 102. The DSDS device 102 is in a connected mode on the first SIM when there is an ongoing PS data session between the DSDS device 102 and the first network 100a on the first SIM by utilizing the RF transceiver. During the ongoing PS data session, the DSDS device 102 receives the plurality of signaling messages in a sequential manner, as described below:

The DSDS device 102 receives a message with a message sequence number "1" and a payload (p1) from the first network 100a during the ongoing PS data session, in step 702.

The DSDS device 102 receives a message with a message sequence number "2" and a payload (p2) from the first network 100a during the ongoing PS data session, in step 704.

The DSDS device 102 receives a message with a message sequence number "3" and a payload (p3) from the first network 100a during the ongoing PS data session, in step 706.

The antenna 106 is used by the second SIM to establish a connection between the DSDS device 102 and the second network 100b. The connection is established to perform an area update procedure. During this time, messages with message sequence numbers SN4-SN3 and payloads (p14-p18) are missed by the DSDS device 102 since the RF transceiver is used by the second SIM, in step 708.

After completing the area update procedure, the RF transceiver is used by the first SIM to re-establish the connection between the first network 100a and the DSDS device 102, in step 710.

After re-establishing the connection between the DSDS device 102 and the first network 100a, the DSDS device 102 receives a new message with a message sequence number "4" and a payload "p19" from the first network 100a, in step 712. The message sequence number "4" of the new message is greater than the message sequence number "3" of the last received message (i.e., previous message) in step 706.

After receiving the new message, the DSDS device 102 validates the new message by performing first level of integrity validation without incrementing the hyper frame number of the new message, in step 714. Performance of the first level of integrity validation of the new message is described in greater detail above with respect to FIG. 5.

If the first level of integrity validation is unsuccessful then, the DSDS device 102 increments the hyper frame number, in step 716.

The new message is validated by performing the second level of integrity validation with the incremented hyper frame number, in step 718.

The new message is processed by the DSDS device 102 when the second level of integrity validation is successful, in step 720. Performance of the second level of integrity validation of the new message is described in greater detail above with respect to FIG. 6.

For example, in a scenario in which the stack 2 is active, stack 1 saves the copy of the last received message from the first network 100a after performing the integrity validation. The DSDS device 102 performs the two level integrity checks, if the message sequence number of the newly received message is greater than the message sequence number of the last received message. The first level of integrity validation is performed without incrementing the hyper frame number. If the first level of integrity validation is successful, the newly received message is processed further after determining that the previous message is not the same as the newly received message. If the first level of integrity validation is unsuccessful, the second level of integrity validation is performed by incrementing the hyper frame number. If the second level of integrity validation is successful, the newly received message is processed when the previous message is not same as the newly received message and the process is continued using the incremented hyper frame number. If the second level of integrity validation is unsuccessful or if the newly received message is detected as a duplicate message, then the newly received message is discarded.

The various actions, acts, blocks, steps, or the like, in FIG. 7, may be performed in the order presented, in a different order, or simultaneously. Further, in some embodiments, some of the actions, acts, blocks, steps, or the like may be omitted, added, modified, skipped, or the like, without departing from the scope of the present disclosure.

Although the embodiments are described with respect to a scenario in which a tune up procedure is performed to carry out an area update procedure, it is to be understood that other embodiments are not limited thereto. The proposed system and method can be used in any scenario where the UE has lost some of the messages. For example, the UE may be under a shallow area (poor or no network signal) due to which some of the messages may be lost. In such scenarios, the proposed method and system can be for providing the integrity protection.

Figure 8:
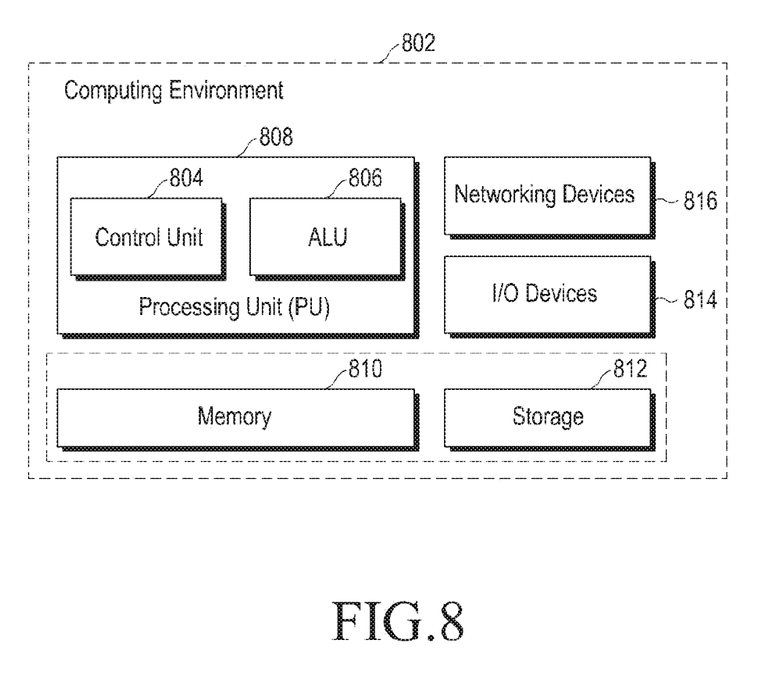
FIG. 8 is a diagram illustrating a computing environment implementing a method for performing integrity protection in the DSDS device, according to an embodiment of the present disclosure.

FIG. 8 is a diagram illustrating a computing environment implementing the method for providing integrity protection in the DSDS device, according to an embodiment of the present disclosure. A computing environment 802 includes at least one processing unit 808 that is equipped with a control unit 804 and an arithmetic logic unit (ALU) 806, a memory 810, a storage unit 812, a plurality of networking devices 816, and a plurality input/output (I/O) devices 814. The processing unit 808 is responsible for processing the instructions of the schemes. The processing unit 808 receives commands from the control unit 804 in order to perform processing. Any logical and arithmetic operations involved in the execution of the instructions are computed with the help of the ALU 806.

The overall computing environment 802 can be composed of multiple homogeneous or heterogeneous cores, multiple central processing units (CPUs) of different kinds, special media and other accelerators. The processing unit 808 is responsible for processing the instructions of the schemes. Further, the plurality of processing units 808 may be located on a single chip or over multiple chips.

The scheme that includes instructions and codes required for the implementation are stored in the memory unit 810, the storage 812, or both. At the time of execution, the instructions may be fetched from the corresponding memory 810 or storage 812, and executed by the processing unit 808.

In case of hardware implementations, various networking devices 816 or external I/O devices 814 may be connected to the computing environment to support the implementation through the networking unit and the I/O device unit.

The embodiments of the present disclosure can be implemented through at least one software program running on at least one hardware device and performing network management functions to control the elements. The elements shown in the FIGS. 1A through 8 include blocks that can be at least one of a hardware device, or a combination of a hardware device and a software units.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A method for providing integrity protection in a dual subscriber identity module (SIM) dual standby (DSDS) device, the method comprising:
   receiving a new message after a tune-away procedure from a first SIM to a second SIM;
   determining whether a first message sequence number of the new message is greater than a second message sequence number of a previous message;
   generating a first candidate message authentication code (MAC) based on a hyper frame number of the new message, when the first message sequence number of the new message is greater than the second message sequence number of the previous message;
   determining whether a MAC of the new message and the first candidate MAC are the same; and
   validating the new message, when the MAC of the new message and the first candidate MAC are the same.

2. The method of claim 1, further comprising:
   incrementing the hyper frame number, when the MAC of the new message and the first candidate MAC are not the same;
   validating the new message by performing a second level of integrity validation on the new message with the incremented hyper frame number; and
   processing the new message, when the second level of integrity validation is successful.

3. The method of claim 2, wherein validating the new message by performing the second level of integrity validation comprises:
   generating a second candidate MAC based on the incremented hyper frame number;
   determining whether the MAC of the new message and the second candidate MAC are the same; and
   validating the new message, when the MAC of the new message and the second candidate MAC are the same.

4. A dual subscriber identity module (SIM) dual standby (DSDS) device, comprising:
   a first SIM card;
   a second SIM card;
   a memory; and
   a processor coupled to the memory, and at least one of the first SIM card, and the second SIM card, wherein the processor is configured with processor executable instructions to:
   receive a new message after a tune-away procedure from the first SIM to the second SIM;
   determine that the new message is a duplicate message and discard the new message, when a first payload of the new message and a second payload of a previous message are the same, and when a first message sequence number of the new message and a second message sequence number of the previous message are the same;
   generate a first candidate message authentication code (MAC) based on a hyper frame number of the new message, when the first message sequence number is greater than the second message sequence number of the previous message;
   determine whether a MAC of the new message and the first candidate MAC are the same;
   validate the new message, when the MAC of the new message and the first candidate MAC are the same;
   generate a second candidate MAC based on an incremented hyper frame number of the new message, when the MAC of the new message and the first candidate MAC are not the same;
   determine whether the MAC of the new message and the second candidate MAC are the same; and
   validate the new message, when the MAC of the new message and the second candidate MAC are the same.

5. A dual subscriber identity module (SIM) dual standby (DSDS) device, comprising:
   a first SIM card;
   a second SIM card;
   a memory; and
   a processor coupled to the memory, and at least one of the first SIM card, and the second SIM card, wherein the processor is configured with processor executable instructions to:

receive a new message from a network entity after a tune-away procedure from the first SIM to the second SIM;

determine whether a first message sequence number of the new message is greater than a second message sequence number of a previous message;

generate a first candidate message authentication code (MAC) based on a hyper frame number of the new message, when the first message sequence number of the new message is greater than the second message sequence number of the previous message;

determine whether a MAC of the new message and the first candidate MAC are the same; and validate the new message, when the MAC of the new message and the first candidate MAC are the same.

6. The DSDS device of claim 5, wherein the processor is further configured to:

increment the hyper frame number, when the MAC of the new message and the first candidate MAC are not the same;

validate the new message by performing a second level of integrity validation on the new message with the incremented hyper frame number; and process the new message when the second level of integrity validation is successful.

7. The DSDS device of claim 6, wherein, in validating the new message by performing the second level of integrity validation, the processor is further configured to:

generate a second candidate MAC based on the incremented hyper frame number;

determine whether a MAC of the new message and the second candidate MAC are the same; and validate the new message, when the MAC of the new message and the second candidate MAC are the same.

8. A computer program product comprising computer executable program code recorded on a computer readable non-transitory storage medium, said computer executable program code when executed causing actions including:

receiving a new message after a tune-away procedure from a first subscriber identity module (SIM) to a second SIM;

determining that the new message is a duplicate message and discarding the new message, when a first payload of the new message and a second payload of a previous message are the same, and when a first message sequence number of the new message and a second message sequence number of the previous message are the same;

generating a first candidate message authentication code (MAC) based on a hyper frame number of the new message, when the first message sequence number is greater than the second message sequence number of the previous message;

determining whether a MAC of the new message and the first candidate MAC are same;

validating the new message when the MAC of the new message and the first candidate MAC are same;

generating a second candidate MAC based on an incremented hyper frame number of the new message when the MAC of the new message and the first candidate MAC are not same;

determining whether the MAC of the new message and the second candidate MAC are the same; and validating the new message, when the MAC of the new message and the second candidate MAC are the same.

9. A computer program product comprising computer executable program code recorded on a computer readable non-transitory storage medium, said computer executable program code when executed causing actions including:

receiving a new message from a network entity after a tune-away procedure from a first subscriber identity module (SIM) to a second SIM;

determining whether a first message sequence number of the new message is greater than a second message sequence number of a previous message;

generating a first candidate message authentication code (MAC) based on a hyper frame number of the new message, when the first message sequence number of the new message is greater than the second message sequence number of the previous message;

determining whether a MAC of the new message and the first candidate MAC are the same; and validating the new message, when the MAC of the new message and the first candidate MAC are the same.

10. A method for providing integrity protection in a dual subscriber identity module (SIM) dual standby (DSDS) device, the method comprising:

receiving a new message after a tune-away procedure from the first SIM to the second SIM;

determining that the new message is a duplicate message and discarding the new message, when a first payload of the new message and a second payload of a previous message are the same, and when a first message sequence number of the new message and a second message sequence number of the previous message are the same;

generating a first candidate message authentication code (MAC) based on a hyper frame number of the new message, when the first message sequence number is greater than the second message sequence number of the previous message;

determining whether a MAC of the new message and the first candidate MAC are the same;

validating the new message, when the MAC of the new message and the first candidate MAC are the same;

generating a second candidate MAC based on an incremented hyper frame number of the new message, when the MAC of the new message and the first candidate MAC are not the same;

determining whether the MAC of the new message and the second candidate MAC are the same; and validating the new message, when the MAC of the new message and the second candidate MAC are the same.

* * * * *

UNITED STATES PATENT AND TRADEMARK OFFICE
CERTIFICATE OF CORRECTION

PATENT NO. : 9,992,810 B2
APPLICATION NO. : 15/221181
DATED : June 5, 2018
INVENTOR(S) : Ananth Kumar Ramasamy et al.

Page 1 of 1

It is certified that error appears in the above-identified patent and that said Letters Patent is hereby corrected as shown below:

On the Title Page (30) Foreign Application Priority Data:
Indian Complete Patent Application No. "1269/2015"
Should be:
-- 1269/CHE/2015 --

Signed and Sealed this
Fifteenth Day of January, 2019

Andrei Iancu
*Director of the United States Patent and Trademark Office*